ســ

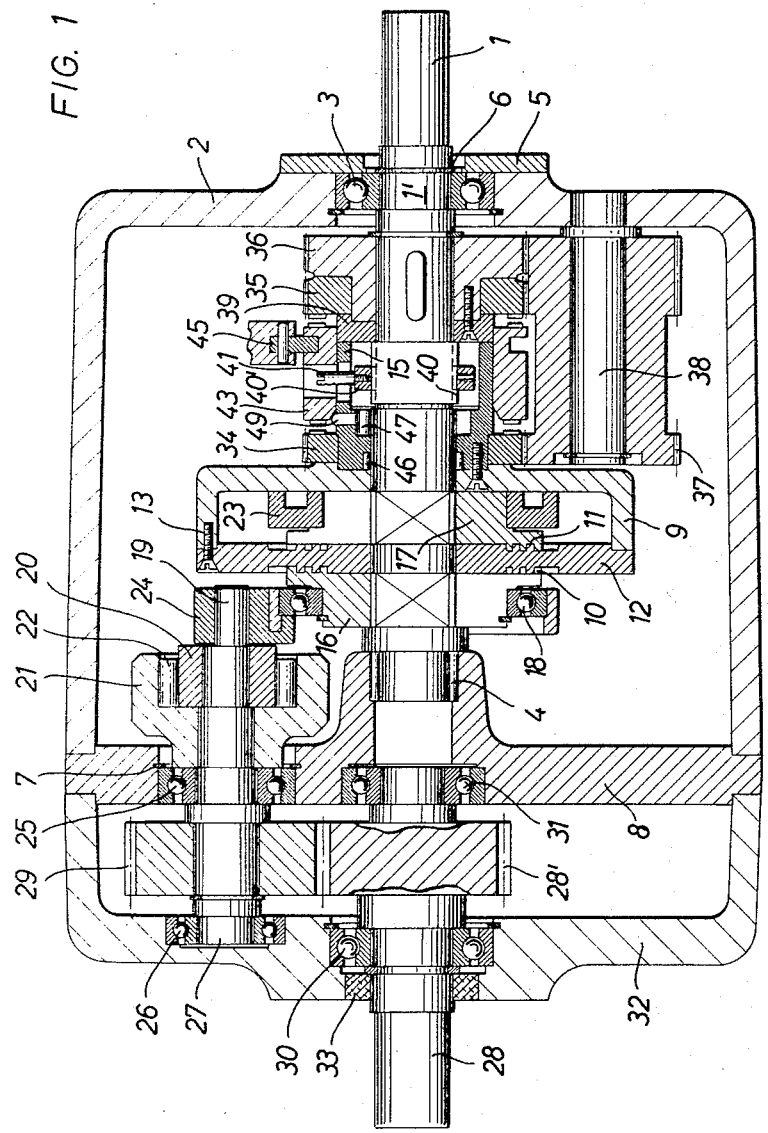

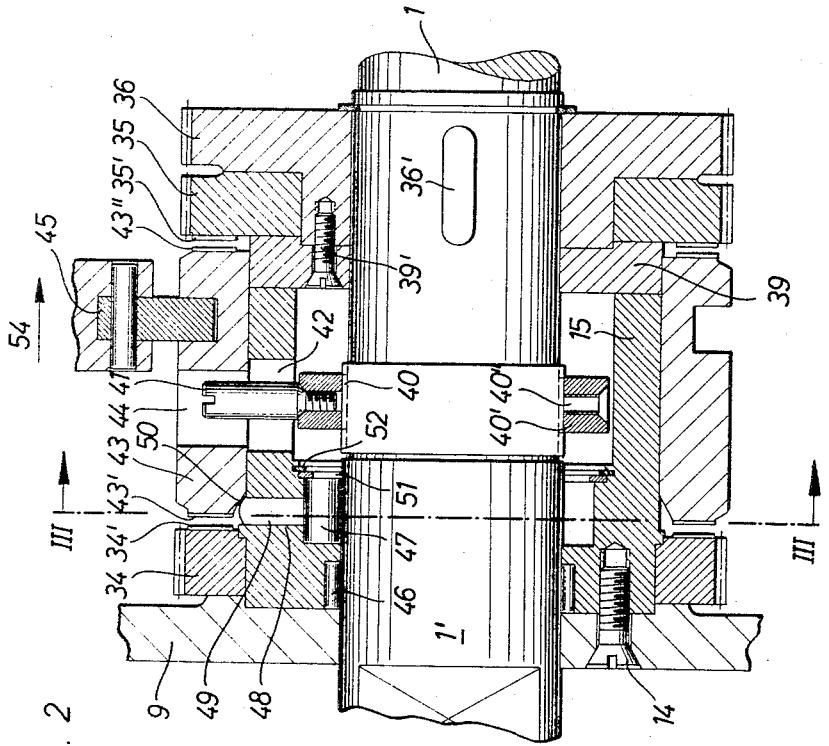
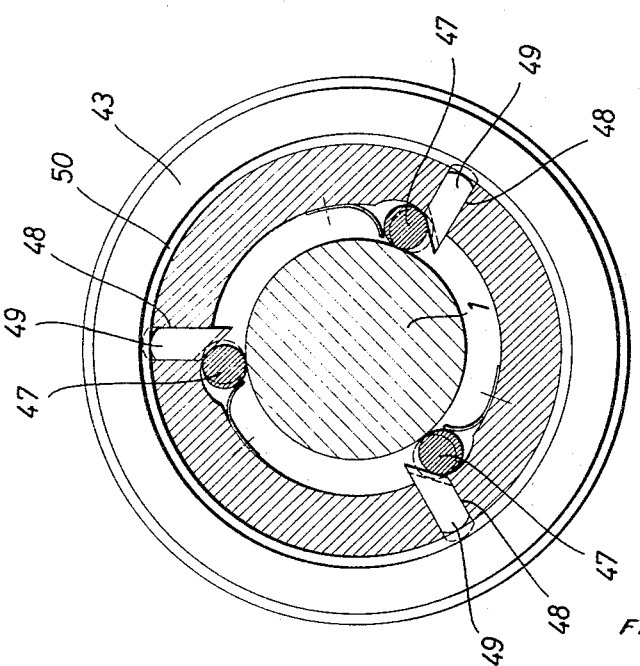

United States Patent Office 3,306,117
Patented Feb. 28, 1967

3,306,117
CONTROL MECHANISM FOR INFINITELY
VARIABLE GEARING
Franz Riedl, Boos, near Memmingen, Germany
Filed Feb. 3, 1965, Ser. No. 430,019
Claims priority, application Germany, Feb. 7, 1964,
R 37,157
3 Claims. (Cl. 74—117)

The present invention relates to improvements in a control mechanism for an infinitely variable gearing especially for a motor vehicle of the type as described in my U.S. Patent No. 3,171,298, which comprises a pair of circular plates or the like which are provided on one side with teeth and are rotatable with the drive shaft and are adjustable vertically thereto in opposite directions to each other by means of a disk which has a plane self-locking worm thread on each side thereof in threaded engagement with the teeth of the two plates, and in which one of the plates is adapted to control the oscillatable members of free wheel clutches or ratchet drive mechanisms for rotating the driven shaft, while the other plate serves as a counter-balance for the first plate, and which further comprises means for varying the speed of rotation of the worm-threaded disk so as to be equal to or lower or higher than the speed of the drive shaft. These means consist of three gear wheels which have an equal pitch diameter but different numbers of teeth and are all in engagement with each other by meshing with a pinion which is rotatably mounted on a shaft which is secured to the housing. Two of these gear wheels are additionally provided with clutch teeth which are adapted to be alternately engaged with two sets of corresponding clutch teeth on a coupling sleeve which is rotatable with the drive shaft and axially slidable thereon to effect such alternate engagement between the drive shaft and the clutch teeth on these two gear wheels.

In my prior patent as above referred to the three gear wheels were mounted on the drive shaft so as to be freely rotatable relative thereto, one of these gear wheels was rigidly secured to the worm-threaded disk, the hub of this gear wheel served as a bearing for the two other gear wheels, and each of the three gear wheels was rigidly secured to a clutch disk or ring which was provided with clutch teeth and was adapted to be moved alternately into engagement with the internal or external teeth on a coupling sleeve which was rotatable with the drive shaft and axially slidable thereon to effect such alternate engagement. Another feature of this prior control mechanism consisted in the fact that the clutch ring on the gear wheel which was secured to the worm-threaded disk was disposed between the clutch rings which are secured to the two other gear wheels, and that the external teeth of two of the clutch rings were equal to the internal teeth on the coupling sleeve, while the third clutch ring was provided with internal teeth which were equal to the external teeth on the coupling sleeve.

Although the control mechanisms of the above-mentioned type have proved very successful, it has been found that they have the disadvantage that their production is relatively difficult and expensive and that the clutch teeth of the coupling sleeve can be engaged with those on the gear wheels only when they are in accurate alignment with the tooth spaces between the clutch teeth of the respective gear wheel.

It is an object of the present invention to provide a control mechanism which, although fundamentally similar to those as above described, overcomes the mentioned disadvantages of the latter.

For attaining this object, the present invention provides that the central worm-threaded disk is rigidly secured to a bushing on which one of the three gear wheels is freely rotatable which is additionally provided on one side with radial clutch teeth, that a coupling sleeve which is provided with radial teeth on both ends is mounted on this bushing so as to be axially slidable thereon but to be rotatable therewith, that the second gear wheel which is likewise additionally provided with radial clutch teeth on one side is freely rotatable relative to the drive shaft, that the third gear wheel is secured to the drive shaft so as to rotate continuously therewith, that the two first gear wheels are mounted in such positions that the radial teeth on the opposite ends of the clutch sleeve may be alternately engaged with the radial clutch teeth on one gear wheel or the other, and that grip rollers are provided between the drive shaft and the bushing which is secured to the central worm-threaded disk and these grip rollers are adapted normally to connect the bushing to the drive shaft but to release the bushing automatically when the latter is moved toward the first gear wheel. Another feature of the present invention provides that for effecting this automatic release of the grip rollers, the bushing is provided adjacent to the points where the grip rollers are located with radial bores in each of which a pin is slidable, the length of which is greater than the thickness of the wall of the bushing at this point, and that the clutch sleeve which is axially slidable along the outer surface of the bushing is provided on the inner edge of its side facing the first gear wheel with a cam surface which, when the clutch sleeve is moved toward this first gear wheel so as to engage with its radial clutch teeth, acts against the outer ends of the pins which are thereby depressed and pushed against the grip rollers which are thereby shifted to a releasing position in which the bushing is released from the drive shaft.

The features and advantages of the present invention will become more clearly apparent from the following detailed description thereof which is to be read with reference to the accompanying drawings, in which:

FIGURE 1 shows a longitudinal section of an infinitely variable gearing together with the control mechanism according to the invention;

FIGURE 2 shows an enlarged view of the control mechanism according to FIGURE 1; while FIGURE 3 shows a cross section which is taken along the line III—III of FIGURE 2.

Referring to the drawings, the infinitely variable gearing comprises a drive shaft 1 which is rotatably mounted in a cup-shaped housing 2 by means of ball or roller bearings 3 and 4. Bearing 3 is mounted within the bottom of housing 2 and is sealed toward the outside by an oil seal ring 6 which is held in place by a cover plate 5. The other bearing 4 is mounted on a partition 8 which is rigidly secured to the housing 2 and provided with several apertures 7.

Drive shaft 1 carries a cup-shaped member 9 which is freely rotatable thereon and is closed by a flat disk 12 which is rigidly secured to the rim of the cup-shaped member 9 by screws 13 and is provided with plane worm threads 10 and 11 which are cut into each side thereof. Worm thread 10 on the outer side of disk 12 engages with corresponding teeth on a sector of a circular plate 16, while worm thread 11 on the inner side of disk 12 engages with corresponding teeth on a sector of a circular plate 17. Worm threads 10 and 11 on disk 12 and the corresponding teeth on plates 16 and 17 are designed so that plates 16 and 17 will be moved in opposite directions to each other when the speed of rotation of disk 12 changes relative to the speed of drive shaft 1. The two plates 16 and 17 are guided on drive shaft 1 so as to be movable radially to the latter and therefore revolve at the same speed as drive shaft 1. Plate 16 acts by means of a ball bearing 18 upon several oscillating arms 19 of freewheel clutches or the like (only one of which is shown) which may be of the same type as described and illustrated in detail in my previous U.S. Patent No. 3,171,298, and the inner main members of which are designated in FIGURE 1 by the numeral 20, the outer main members by the numeral 21, and the grip rollers by the numeral 22. The other plate 17 supports a ring 23 and together with this ring forms a counterweight for counter-balancing any eccentricity of plate 16 relative to the drive shaft 1. When the arms 19 are moved back and forth by segments 24, the inner main members 20 of the freewheel clutches also oscillate and thereby, for example, during their forward movement, take along the outer main members 21 so that the shafts 27 of the clutches which are mounted on roller bearings 25 and 26, and only one of which is shown in FIGURE 1 so as not to diminish the clarity of the drawing, will be rotated in the same direction. Each shaft 27 carries a gear wheel 29 which meshes with a gear 28' which is secured to the driven shaft 28. This driven shaft 28 is mounted on bearings 30 and 31 in the cover 32 of the housing and in the partition 8, respectively. The inside of cover 32 is sealed toward the outside by an oil seal ring 33.

The control mechanism according to the present invention differs from that disclosed in my previous patent above referred to by the fact that the cup-shaped member 9 is rigidly secured by screws 14 to a cup-shaped bushing 15 on which a first gear wheel 34 is freely rotatable. A second gear wheel 35 is freely rotatable on the hub of a third gear wheel 36 which rotates continuously with the drive shaft 1 since it is secured thereto by a key 36'. The three gear wheels 34, 35, and 36 have an equal pitch diameter and are meshing with a pinion 37 which is freely rotatable on a shaft 38 which is secured to the housing 2.

Bushing 15 and the hub of the third gear wheel 36 are separated by a spacing ring 39 which maintains the second gear wheel 35 in the proper position and is secured by screws 39' to the third gear wheel 36. Approximately at the center of its length within the housing 2, drive shaft 2 is provided with a thread 40 on which an internally threaded ring 40' is screwed so as to be rotatable relative to the drive shaft 1. Ring 40 is provided with a plurality of radial bores 40" into one of which a pin 41 is screwed which is slidable within a longitudinal slot 42 in bushing 15 and also within a longitudinal slot 44 in a coupling sleeve 43 through the open outer side of which it is easily possible to screw the pin 41 into and out of one of the radial bores 40". Coupling sleeve 43 is axially slidable on bushing 15 by suitable mechanical or electromagnetic control means which are indicated by a control member 45. Coupling sleeve 43 is provided with radial clutch teeth 43' and 43" on both end surfaces which, when this sleeve is shifted toward one side or the other, are adapted to engage with corresponding radial clutch teeth 34' on gear wheel 34 or with radial clutch teeth 35' on gear wheel 35. The cup-shaped bushing 15, the bottom part of which is rotatably mounted on drive shaft 1 by means of a bearing 46 contains several, for example, three grip rollers 47 which connect the drive shaft at the part 1' thereof to the bushing 15 as long as the drive shaft rotates and no clutch-shifting operation occurs to change the speed of the driven shaft 28.

Adjacent to the points where the grip rollers 47 are disposed within the bushing 15, the latter is provided with radial bores 48 in each of which a pin 49 with an inclined lower end surface is slidable which has a length greater than the thickness of the wall of bushing 15 at this particular part thereof. The inner edge of coupling sleeve 43 which faces the first gear wheel 34 is provided with a conical end surface 50 which serves as a cam surface and is adapted to act upon the outer ends of pins 49. Grip rollers 47 are held in place in the axial direction by a ring 51 and a spring ring 52.

In the following description of the manner of operation of the control mechanism according to the invention it is assumed, by way of example, that the first gear wheel 34 has seventy-nine teeth, the second gear wheel 35 eighty-one teeth, and the third gear wheel 36 eighty teeth. Of course, these gear wheels may just as well be provided with different numbers of teeth.

If the drive shaft 1 runs at the speed of the engine and the parts of the control mechanism are in the position as shown in the drawings, the driven shaft 28 does not rotate since the worm-threaded disk 12 is then in its neutral position concentrically to the drive shaft 1. The individual components of the control mechanism therefore remain at this time in the same position relative to each other. If the rotation of the driven shaft 28 is to be started, coupling sleeve 43 is shifted toward the right by the control member 45, that is, in the direction of the arrow 54 in FIGURE 2, whereby the clutch teeth 43" on coupling sleeve 43 are engaged with the clutch teeth 35' on gear wheel 35 so that this gear wheel is then driven by the drive shaft 1. As soon as this occurs, the grip rollers 47 are released and drive shaft 1 and bushing 15 are disengaged from each other. Since gear wheel 35 engages through the pinion 37 with the first gear wheel 34, the cup-shaped member 9 and thus also the worm-threaded disk 12 are rotated relative to the drive shaft 1 inasmuch as by this coupling operation not only the coupling sleeve 43 but also the bushing 15 are driven at the same speed as the second gear wheel 35. The circular plate 16 is therefore shifted radially toward the outside and thereby acts through the arms 19 upon the inner main members 20 of the eccentric freewheel clutches so as to oscillate the same so that the outer main members 21 of these clutches will then be driven in the same direction and the driven shaft 28 will also start to rotate. Since after the engagement of the clutch teeth 43" of coupling sleeve 43 with the clutch teeth 35' of gear 35 bushing 15 is driven at a slightly higher speed that the drive shaft 1, the threaded ring 40', the pin 41 of which is guided in the slots 42 and 44, is shifted along the drive shaft 1 in the direction opposite to the arrow 54, that is, toward the left, until it abuts against the left end surface of slot 44 and thereby pushes the coupling sleeve 43 toward the left so that the clutch teeth 43" and 35' will be disengaged from each other. It is thus possible to set the exact speed at which the driven shaft 28 should be rotated. In the particular embodiment of the invention as illustrated, the threaded ring 40' is located in such a position that the threaded disk 16 reaches its greatest degree of eccentricity when the pin 41 abuts against the left end surface of the longitudinal slot 44. If the threaded disk 16 should not be moved so far outwardly as the greatest possible eccentricity of this disk would permit, it is necessary while the entire gearing is standing still to reduce the distance which this ring 40' will be able to traverse. It would therefore then be necessary to screw the ring 40' farther to left on the drive shaft 1. Such an adjustment of the starting position of ring 40' may be effected by unscrewing the pin 41 from this ring and by then turning the ring to the desired position. After ring 40' has been properly adjusted to a position which corresponds to the desired maximum speed of the driven shaft, pin 41 is screwed back into one of the other openings 40" which are provided for this purpose.

If the speed of the driven shaft 28 should be reduced, coupling sleeve 43 may be shifted toward the left, that is, in the direction opposite to that of the arrow 54 because pin 41 is then in its left end position. The clutch teeth 43' may then be engaged with the clutch teeth 34' on gear wheel 34. By this movement, the conical cam surface 50 of coupling sleeve 43 presses all of the pins 49 into the bushing 15 so that all grip rollers 47 will be released. Since the first gear wheel 34 now rotates at a slightly lower speed than the drive shaft 1 and the cup-shaped member 9 and the threaded disk 12 therefore also rotate at such a lower speed, disk 12 will shift the circular plates 16 and 17 in opposite radial directions toward the axis of drive shaft 1. As soon as the clutch teeth 34' and 43' are engaged with each other, the reduction in speed of coupling sleeve 43 is also transmitted through pin 41 to the threaded ring 40' which is thereby turned relative to the drive shaft 1 and moved in the direction of the arrow 54 toward its basic position which it reaches shortly before the circular plates 16 and 17 reach their original neutral position, i.e., the position as illustrated in the drawings. Sleeve 43 is thereby automatically disengaged from the first gear 34.

If the threaded ring 40' has been adjusted, for example, to such a position that the driven shaft 28 reaches a certain maximum speed of, for example, 2500 r.p.m., and if the driven shaft should thereafter run at a lower speed of, for example, 2000 r.p.m., sleeve 43 must be disengaged from the second gear wheel 35 by the control member 45 before this is done by the pin 41.

The control mechanism according to the invention has the particular advantage that its individual components may be easily and inexpensively produced and may also be assembled in a very simple manner, and that, due to their particular design, all parts which are to be engaged with each other may be easily disengaged at any time, especially since it is no longer necessary to engage and disengage regular gears but merely radial clutch teeth, the flanks of which extend at an acute angle toward the axis and to each other. Since the forces which are required for shifting the coupling sleeve are very small and the distances along which it has to be moved are relatively short, it is now also possible to operate the control mechanism electromagnetically. Such electromagnetic actuation could not be reliably attained with the prior control mechanisms on which the present invention is based since, unless the clutch teeth of the respective parts to be engaged were in proper alignment with each other, no engagement of these teeth could take place, and also since the coupling sleeve had to be shifted for very considerable distances and such shifting also required a considerable force.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. In an infinitely variable gearing having a housing, a drive shaft and a driven shaft rotatably mounted in said housing, means operatively connecting said drive shaft and said driven shaft including clutch means having oscillatable members for driving said driven shaft at different speeds, a disk mounted on said drive shaft so as to be rotatable relative thereto and having plane self-locking worm threads on both sides thereof, a circular plate on each side of said disk and in threaded engagement with said worm threads and mounted on said drive shaft so as to be rotatable with but slidable in a vertical direction relative to said drive shaft and in opposite directions to each other, the first of said plates adapted to be moved in response to rotation of said disk from a neutral position in which said first plate is disposed substantially coaxial with said drive shaft and free of torque transmitting connection with said oscillatable members to different positions eccentric to said drive shaft, means operative in response to the assumption by said first plate of said different positions to establish a torque-transmitting connection between said first plate and said oscillatable members, the speed of said driven shaft being adapted to be increased in accordance with the increase in eccentricity of said first plate relative to said drive shaft in response to rotation of said disk, the second plate serving as a counterweight to counter-balance the eccentricity of said first plate, and means for varying the speed of said disk relative to the speed of said shaft having equal pitch diameters but different numbers of teeth, a pinion rotatably mounted on said housing and in mesh with said three gear wheels, two of said gear wheels being rotatable relative to said drive shaft and the third gear wheel being secured to said drive shaft, a bushing on and rotatable relative to said drive shaft and secured to said disk, a coupling sleeve axially slidable on said bushing intermediate said first two gear wheels but nonrotatable relative to said bushing and having radial clutch teeth on both end surfaces thereof, said first two gear wheels each having radial clutch teeth on one side facing said clutch teeth on one end surface of said coupling sleeve, said coupling sleeve when shifted toward one slide or the other being adapted alternately to interengage with said clutch teeth on one of said first two gear wheels or the other, means for shifting said coupling sleeve, grip rollers interposed between and normally connecting said bushing to said drive shaft and means for automatically releasing said grip rollers so as to permit said bushing to rotate relative to said drive shaft when said coupling sleeve is shifted toward one of said first two gears.

2. In an infinitely variable gearing having a housing, a drive shaft and a driven shaft rotatably mounted in said housing, means operatively connecting said drive shaft and said driven shaft including clutch means having oscillatable members for driving said driven shaft at different speeds, a disk mounted on said drive shaft so as to be rotatable relative thereto and having plane self-locking worm threads on both sides thereof, a circular plate on each side of said disk and in threaded engagement with said worm threads and mounted on said drive shaft so as to be rotatable with but slidable in a vertical direction relative to said drive shaft and in opposite directions to each other, the first of said plates adapted to be moved in response to rotation of said disk from a neutral position in which said first plate is disposed substantially coaxial with said drive shaft and free of torque transmitting connection with said oscillatable members to different positions eccentric to said drive shaft, means operative in response to the assumption by said first plate of said different positions to establish a torque-transmitting connection between said first plate and said oscillatable members, the speed of said driven shaft being adapted to be increased in accordance with the increase in eccentricity of said first plate relative to said drive shaft in response to rotation of said disk, the second plate serving as a counterweight to counter-balance the eccentricity of said first plate, and means for varying the speed of said disk relative to the speed of said drive shaft comprising three gear wheels on said drive shaft having equal pitch diameters but different numbers of teeth, a pinion rotatably mounted on said housing and in mesh with said three gear wheels, a bushing on and rotatable relative to said drive shaft and secured to said disk, two of said gear wheels being rotatable relative to said drive shaft and at least one of said two gear wheels being mounted on said bushing so as to be rotatable relative thereto, the third of said gear wheels being secured to said drive shaft, a coupling sleeve axially slidable on said bushing intermediate said first two gear wheels but nonrotatable relative to said bushing and having radial clutch teeth on both end surfaces thereof, said first two gear wheels each having radial clutch teeth on one side facing said clutch teeth on one end surface of said coupling sleeve, said coupling sleeve when shifted toward one side or the other being adapted alternately to engage with said clutch teeth on one of said first two gear wheels or the other, means for shifting said coupling sleeve, grip rollers within said bushing between the inner wall surface thereof and said drive shaft and normally adapted to connect said bushing to said drive shaft, the wall of said bushing having radial bores therein adjacent to the points of location of said grip rollers, a pin slidable in each of said radial bores and having a length greater than the thickness of said wall of said bore at said points, and a conical cam surface on the inner edge of said coupling sleeve facing a first of said first two gear wheels and adapted to act upon the outer ends of said pins and depress the same so that their inner ends will displace said grip rollers from their gripping position and thereby release said bushing from said shaft when said coupling sleeve is moved toward said first of said first two gear wheels.

3. In an infinitely variable gearing having a housing, a drive shaft and a driven shaft rotatably mounted in said housing, means operatively connecting said drive shaft and said driven shaft including clutch means having oscillatable members for driving said driven shaft at different speeds, a disk mounted on said drive shaft so as to be rotatable relative thereto and having plane self-locking worm threads on both sides thereof, a circular plate on each side of said disk and in threaded engagement with said worm threads and mounted on said drive shaft so as to be rotatable with but slidable in a vertical direction relative to said drive shaft and in opposite directions to each other, the first of said plates adapted to be moved in response to rotation of said disk from a neutral position in which said first plate is disposed substantially coaxial with said drive shaft and free of torque transmitting connection with said oscillatable members to different positions eccentric to said drive shaft, means operative in response to the assumption by said first plate of said different positions to establish a torque-transmitting connection between said first plate and said oscillatable members, the speed of said driven shaft being adapted to be increased in accordance with the increase in eccentricity of said first plate relative to said drive shaft in response to rotation of said disk, the second plate serving as a counterweight to counter-balance the eccentricity of said first plate, and means for varying the speed of said disk relative to the speed of said drive shaft comprising three gear wheels on said drive shaft having equal pitch diameters but different numbers of teeth, a pinion rotatably mounted on said housing and in mesh with said three gear wheels, two of said gear wheels being rotatable relative to said drive shaft and the third gear wheel being secured to said drive shaft and secured to said disk, a coupling sleeve axially slidable on said bushing intermediate said first two gear wheels but non-rotatable relative to said bushing and having radial clutch teeth on both end surfaces thereof, said first two gear wheels each having radial clutch teeth on one side facing said clutch teeth on one end surface of said coupling sleeve, said drive shaft having a screw thread thereon, an side or the other being adapted alternatively to interengage with said clutch teeth on one of said first two gear wheels or the other, means for shifting said coupling sleeve, said drive shaft having a screw thread thereon, an internally threaded ring screwed on said screw thread and adapted to be turned relative to said drive shaft, said ring having a plurality of radial tapped bores therein, said bushing having an aperture and said coupling sleeve having a longitudinal slot, a pin removably screwed into one of said tapped bores and extending through said aperture in said bushing into said slot in said coupling sleeve and adapted to slide along said slot when, due to the engagement of the clutch teeth of said coupling sleeve with the clutch teeth on one of said first two gear wheels, said bushing rotates at a slightly higher speed than said drive shaft, whereby said ring is turned relative to said drive shaft and said pin moves in said slot in the direction away from said last-mentioned gear which until it abuts against the end surface of said slot and thereby shifts said coupling sleeve out of engagement with said last-mentioned gear wheel, grip rollers interposed between and normally connecting said bushing to said shaft, and means for automatically releasing said grip rollers so as to permit said bushing to rotate relative to said drive shaft when said coupling sleeve is shifted toward one of said first two gears.

References Cited by the Examiner
UNITED STATES PATENTS 3,171,289    3/1965    Riedl _____ 74—117
3,229,549    1/1966    Reidl _____ 74—640

FRED C. MATTERN, Jr., *Primary Examiner.*

F. E. BAKER, *Assistant Examiner.*